(12) United States Patent
Seppelin et al.

(10) Patent No.: US 12,306,453 B2
(45) Date of Patent: May 20, 2025

(54) APPARATUS AND A METHOD FOR PROCESSING AN OPTICAL FIBER UNIT

(71) Applicant: Rosendahl Nextrom GmbH, Pischelsdorf (AT)

(72) Inventors: Toni Seppelin, Pischelsdorf (AT); Petri Nieminen, Pischelsdorf (AT); Kimmo Similä, Pischelsdorf (AT)

(73) Assignee: Rosendahl Nextrom GmbH, Pischelsdorf (AT)

( * ) Notice: Subject to any disclaimer, the term of this patent is extended or adjusted under 35 U.S.C. 154(b) by 148 days.

(21) Appl. No.: 18/313,906

(22) Filed: May 8, 2023

(65) Prior Publication Data

US 2023/0358988 A1    Nov. 9, 2023

(30) Foreign Application Priority Data

May 9, 2022   (FI) ...................................... 20225402

(51) Int. Cl.
  *G02B 6/52*    (2006.01)
  *G02B 6/44*    (2006.01)

(52) U.S. Cl.
  CPC ............. *G02B 6/52* (2013.01); *G02B 6/4484* (2013.01); *G02B 6/4483* (2013.01)

(58) Field of Classification Search
  CPC ....... G02B 6/4483; G02B 6/4484; G02B 6/52
  See application file for complete search history.

(56) References Cited

U.S. PATENT DOCUMENTS

| | | |
|---|---|---|
| 4,640,576 A | 2/1987 | Eastwood et al. |
| 4,702,404 A | 10/1987 | Einsle et al. |

(Continued)

FOREIGN PATENT DOCUMENTS

| | | |
|---|---|---|
| CA | 1 218 810 | 3/1987 |
| CN | 209580443 U | 11/2019 |

(Continued)

OTHER PUBLICATIONS

Oct. 12, 2023 Search Report issued in European Patent Application No. 23171861.0, pp. 1-7.

(Continued)

*Primary Examiner* — Daniel Petkovsek
(74) *Attorney, Agent, or Firm* — Nixon & Vanderhye PC

(57) ABSTRACT

This invention relates to an apparatus (1) for processing an optical fiber unit, the apparatus comprising an extruder head (2) with an inlet (6) receiving an optical fiber unit (7) including at least one optical fiber (24) and an outlet (4) outputting with a tube speed a produced tube (3), and a capstan (25) receiving and passing on the produced tube (3), the produced tube contacting an outer periphery (19) of the capstan by extending around the capstan. In order to obtain a simple and reliable solution the apparatus comprises a feeding device (13) and a connection (8) to a fluid source (9). The apparatus is configured to launch the optical fiber unit (7) to move with the tube (3) by feeding fluid from the fluid source (9) into the produced tube (3), and activating the feeding device (13) to accelerate the optical fiber unit via the inlet (6) into the tube (3) such that the optical fiber unit reaches the tube speed when the optical fiber unit has reached a predetermined point (P) on the capstan (25), at which stage the feeding device (13) is deactivated.

20 Claims, 2 Drawing Sheets

(56) References Cited

U.S. PATENT DOCUMENTS

| | | | |
|---|---|---|---|
| 7,379,642 | B2 | 5/2008 | Kachmar |
| 10,488,615 | B2 * | 11/2019 | Liberman ........... B29C 48/0018 |
| 2002/0145069 | A1 | 10/2002 | Nechitailo et al. |
| 2005/0121821 | A1 | 6/2005 | Horschlager |
| 2019/0072739 | A1 * | 3/2019 | Liberman ........... B29C 48/0018 |

FOREIGN PATENT DOCUMENTS

| | | |
|---|---|---|
| JP | H02-244016 | 9/1990 |
| JP | H09178992 A | 7/1997 |
| KR | 10-1988-0700289 | 2/1988 |
| KR | 10-0235753 | 12/1999 |
| KR | 10-2010-0007696 | 1/2010 |

OTHER PUBLICATIONS

Search Report for FI Application No. 20225402 dated Dec. 19, 2022, 2 pages.

Jul. 27, 2024 Office Action issued in Korean Patent Application No. 10-2023-0041802, pp. 1-10 [machine translation included].

* cited by examiner

APPARATUS AND A METHOD FOR PROCESSING AN OPTICAL FIBER UNIT

CROSS-REFERENCE TO RELATED APPLICATIONS

This application claims priority to FI patent application No. 20225402 filed May 9, 2022, the entire contents of which is hereby incorporated by reference.

BACKGROUND OF THE INVENTION

Field of the Invention

This invention relates to a solution for processing an optical fiber unit in order to arrange the optical fiber unit within a produced tube.

Description of Prior Art

Previously there is known a solution where an extruder head is used to manufacture a tube. An inlet of the extruder head receives an optical fiber unit. An outlet of the extruder head is used to output the produced tube containing the optical fiber unit. Before the produced tube can be outputted together with the optical fiber unit, the optical fiber unit needs to be launched to move with the tube.

Before launching, the tube is produced and continuously outputted from the extruder head with a tube speed which may be significantly higher than the speed of the optical fiber unit at the moment of launch. Due the speed difference between the tube and the optical fiber unit, it is difficult to obtain a suitable contact between the tube and the optical fiber unit which is needed in order to make the optical fiber unit to move with the tube.

Preferably, launching of the optical fiber unit should be implemented in such a way that a ramp-up section created during launch is as short as possible, in order to avoid quality issues requiring subsequent removal of large sections of the tube and optical fiber unit. However, in case the contact between the optical fiber unit and the tube is too heavy too early, the acceleration of the optical fiber unit will be massive, which causes problems.

SUMMARY OF THE INVENTION

An object of the present invention is to provide an apparatus and a method which significantly simplify launch of the optical fiber unit and ensures that loss due to quality issues can be minimized. This object is achieved with an apparatus according to independent claim 1 and a method according to independent claim 15.

When fluid is introduced into the tube during launch, the fluid prevents the optical fiber unit from heavily contacting the inner walls of the tube too early. Due to this, the optical fiber unit may slide to some extent in relation to the tube, which gives more time for acceleration before the optical fiber unit needs to move with the same speed as the tube. When during launch, the optical fiber unit is fed and accelerated to reach the tube speed at a moment when the optical fiber unit has reached a predetermined point at a capstan, at which stage the feeding is deactivated, appropriate contact between the optical fiber unit and the inner walls of the tube can be obtained in a simple and reliable way.

Preferred embodiments of the invention are disclosed in the dependent claims.

BRIEF DESCRIPTION OF DRAWINGS

In the following the apparatus and method will be described in closer detail by way of example and with reference to the attached drawings, in which.

DESCRIPTION OF AT LEAST ONE EMBODIMENT

Figure 1:
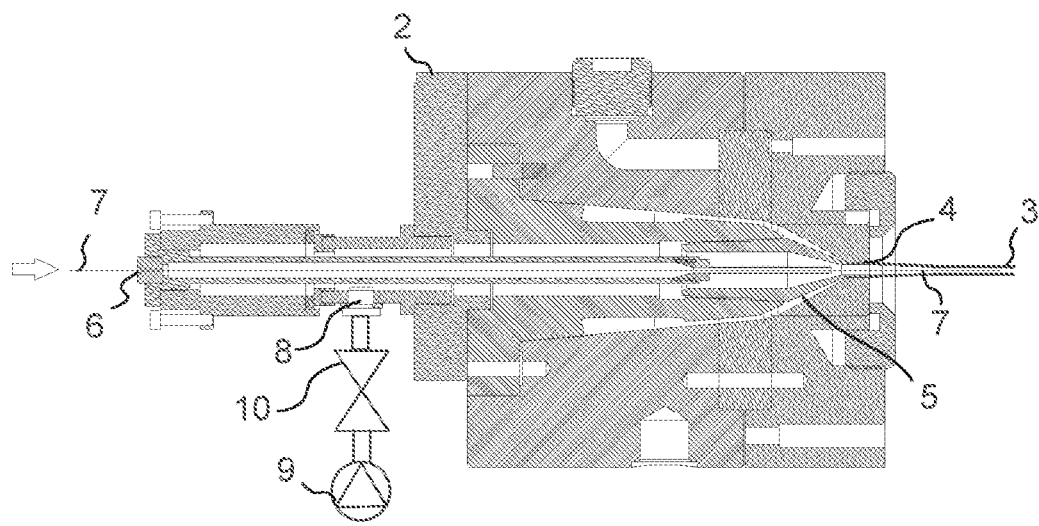
FIG. 1 illustrates an extruder head.

FIG. 1 illustrates an extruder head 2 which is used to produce and output a produced tube 3 via an outlet 4 of the extruder head 2. Plastic material for the tube is received and passed on via channels 5 of the extruder head to an annular opening shaping the tube in proximity of the outlet 4.

The extruder head 2 also comprises an inlet 6 reviving an optical fiber unit 7 including at least one optical fiber. The optical fiber unit may include a plurality of components, such as optical fibers grouped together. Additionally, the components of the optical fiber unit may include one or more yarns. In many practical implementations the components of the optical fiber unit are attached to each other before being fed into the extruder head 2.

As illustrated in FIG. 1, the optical fiber unit 7 is fed through the extruder head 2 of the apparatus 1 to the outlet 4. On the path between the inlet 6 and the outlet 4, the optical fiber unit 7 enters the inside of the tube 3 which is being produced. Due to this, during production when the tube 3 is being produced and moved with a tube speed, the optical fiber unit 7 is outputted from the outlet in such a way that it is located within the tube 3. Initially the speed of the optical fiber unit 7 is much slower than the tube speed, however, eventually the speed of the optical fiber unit will correspond to the tube speed. Preferably, in the final product the optical fiber unit 7 is loosely located within the tube 3, in other words, it is not adhered to the inner walls of the tube.

The extruder head 2 of FIG. 1 comprises a connection 8 in the extruder head 2 to a fluid source 9. In praxis the fluid source may advantageously be implemented as a compressor feeding compressed air into the tube 3, for instance. In that case the air pressure may slightly increase the diameter of the tube, such as with 6-12% during launch of the optical fiber unit. Alternatively, in some implementations the fluid source may provide gel into the tube 3. In any case, the fluid introduced into the tube prevents the optical fiber unit 7 from contacting the inner walls of the tube too heavily at a too early stage, which due to the significant speed difference between the tube and the optical fiber unit, would attempt to accelerate the optical fiber unit 7 very fast to the speed of the tube. Due to the introduction of fluid, such as air, more time is obtained for the acceleration, as the fluid will ensure that the optical fiber unit may initially slide inside the tube, due to which a larger section of the optical fiber unit has time to enter the tube before the optical fiber unit 7 eventually starts to move with the tube speed. This gives more time to accelerate the optical fiber unit. Without fluid, there is a risk that the optical fiber unit may attach to the heated soft plastic material of the tube before the tube has had sufficient time to solidify.

In the illustrated example, the connection from the extruder head 2 to the fluid source 9 is implemented via a valve 10. Introduction of fluid into the tube may be needed only during launch, after which the fluid source 9 may be disconnected from the extruder head via the valve 10, for instance. In case gel is used as the fluid, it may in some implementations be necessary to cut away a leading part of the tube and the optical fiber unit, if the object is to produce a final product which does not contain gel. This can be avoided by using air as the fluid. Alternatively, and in particular if the used fluid is air, it may be beneficial to continue introduction of air into the tube also after the launch. However, the amount and pressure of the air needed is in that case smaller than during launch, such that the feeding of fluid from the fluid source into the tube can be reduced after the fiber launch.

Figure 2:
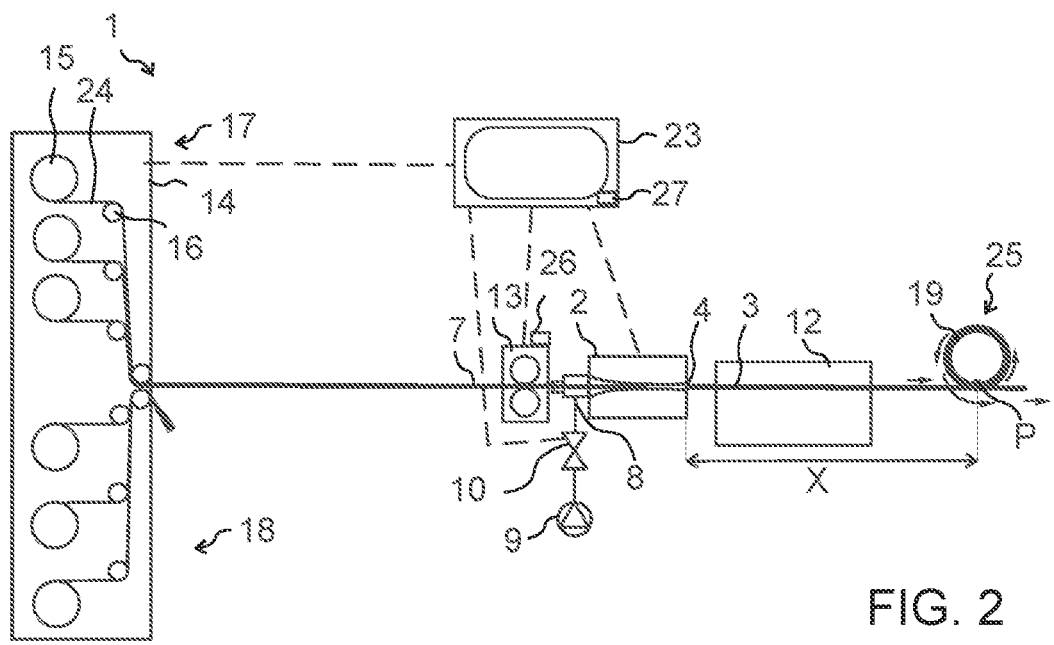
FIG. 2 illustrates an apparatus with the extruder head of FIG. 1.

FIG. 2 illustrate an apparatus, where the extruder head 2 of FIG. 1 is utilized. FIG. 2 illustrates a cooling trough 12, which may be implemented as a liquid (such as water) filled bath that receives the tube 3 from the extruder head 2. Once the tube 3 has cooled and solidified to a greater extent in the cooling trough, it may be passed out from the bath to a capstan 25 implemented as a wheel, for instance, from where it is eventually passed on to a reeling device reeling up the tube with the optical fiber unit inside. In FIG. 2, the produced tube 3 contacts an outer periphery 19 of the capstan 25 by completing a full turn around the capstan.

The apparatus also includes a feeding device 13, such as a feeding capstan, with a pair of wheels for contacting and feeding the optical fiber unit 7 to the inlet 6 of the extruder head 2. The optical fiber unit is received between the pair of wheels, and at least one of the wheels is a driving wheel connected to an electric motor, for instance, for feeding the optical fiber unit. The other wheel may also be a driving wheel, or alternatively, a free-rolling wheel without any connection to an electric motor. In some embodiments a pair of belts may be used instead of the illustrated pair of wheels in the feeding device to contact and feed the optical fiber unit to the inlet of the extruder head.

In FIG. 2 a pay-off 14 is provided with reels for components of the optical fiber unit 7. In praxis, one reel 15 and tensioner 16, such as dancer, is usually provided for each separate optical fiber 24 and yarn included in the optical fiber unit 7. In the illustrated example it is by way of example assumed that in order to facilitate minimal production stops when a reel change is needed, the pay-off 14, is provided with two alternative sets of reels. Components from the upper set 17 of reels (three illustrated reels) initially form the optical fiber unit 7 which is fed to the extruder head 2, while the lower set 18 of reels (three illustrated reels) are off-line and can be replaced with full reels. Once one of the reels in the upper set 17 runs out of material, a cutter may be utilized to cut the optical fiber unit after which a short production stop can be initiated, during which the lower set of reels 18 are threaded and production is continued once the threading is ready. At that stage the upper set 17 or reels is off-line and can be replaced by full reels.

During threading, each separate component of the optical fiber unit 7 is pulled out from its reel in the pay-off 14 and threaded all the way to the extruder head 2 via the feeding device 13. During this threading the components may in some implementations be attached to each other to form a bundle at a suitable location between the pay-off and the extruder head 2. One alternative is to utilize an adhesive bonding together a leading end of the optical fiber unit to ensure that the components remain as a bundle also at the leading end.

When the preparation mode involving threading of the separate components of the optical fiber unit 7 is completed, the wheels of the feeding device 13 are transferred to a line position where the wheels contact the optical fiber unit 7. This transferring may involve moving parts of the feeding device and/or the optical fiber unit 7.

At this stage the feeding device 13 feeds the end of the optical fiber unit 7 into the extruder head 2, and further, until the end of the optical fiber unit 7 protrudes into the tube 3 which at this stage is being produced by the extruder head 2.

During a fiber launch, the tube 3 is being produced and outputted from the outlet 4 of the extruder head 2 with the production speed of the apparatus 1. The tube speed may be up to 1000 m/min or even more and the optical fiber unit 7 needs to accelerate from practically standstill to this tube speed. In FIG. 2 it is by way of example assumed that the apparatus 1 is provided with a control unit 23 controlling the operation of the devices of the apparatus 1. This control unit 23 may be implemented by circuits and/or a programmable device with a processor and a memory running a software such as a computer, for instance. However, in some implementations it may be possible that no control unit is utilized, but the launch is implemented manually by an operator of the apparatus.

When a launch is prepared, feeding of fluid from the fluid source 9 into the tube 3 is initiated. When the launch is triggered, the feeding device 13 is activated to feed and accelerate the optical fiber unit 7 via the inlet 6 into the tube 3 such that the optical fiber unit 3 reaches the tube speed when the optical fiber unit 7 has reached a predetermined point P on the capstan 25. Depending on the implementation, feeding of fluid into the tuber may be initiated in advance of the activation of the feeding device, or at the same moment as the feeding device is activated.

In praxis the predetermined point P on the capstan may be such located, that when the optical fiber unit has reached the predetermined point P, the optical fiber unit 7 surrounds 0-360° of an outer periphery 19 of the capstan 25, at which stage the feeding device 13 is deactivated. At this stage the leading end of the optical fiber unit 7 is in many implementations located on the "back side" of the capstan 25, in other words on the opposite side of the capstan as compared to the outlet 4. The exact location of the predetermined point P may, however, vary in different implementations, depending on the material of the tube 3, for instance, which has an impact on the friction between the tube and the optical fiber unit. Consequently, in some implementations it is advantageous that the predetermined point P on the capstan 25 is such located that the optical fiber unit has reached the predetermined point P on the capstan 25 when the optical fiber unit 7 has completed at least one lap around the capstan 25. In other words, one complete lap or even more may be required to ensure a sufficient contact between the inner walls of the tube and the optical fiber unit before the acceleration with the feeding device is completed.

In practical tests it has been verified, that in many implementations, the predetermined point P and the leading end of the optical fiber unit 3 should be located such that the optical fiber unit 7 surrounds 0-360° of an outer periphery 19 of the capstan 25, at the moment when the speed of the optical fiber unit has reached the tube speed. At that moment the inner walls of the tube and the outer surface of the optical fiber unit 7 will temporarily contact each other (at the turn around of the capstan), and due to this friction ensures that the optical fiber unit will continue to move with the tube. Consequently, at this stage the feeding device 13 may be deactivated. This deactivation may be implemented by moving the first and second wheel of the feeding device away from each other. Alternatively, both the first and second wheel may still be in contact with the optical fiber unit, however, at this stage they both rotate freely in a free-rotating mode without any more affecting the speed of the optical fiber unit 7.

In many practical implementations, the tube 3 and the optical fiber unit 7 may make 3-4 complete turns around the capstan 25 wheel before they are passed on from it. However, in many implementations sufficient contact between the optical fiber unit 7 and the tube 3 is achieved already during the first turn around the capstan wheel, due to which the feeding device can bee deactivated before or at the latest when the optical fiber unit surrounds 360° of the outer periphery of the capstan.

In order for the apparatus to operate correctly during launch, the apparatus 1 preferably monitors the progress during fiber launch to detect when the optical fiber unit reaches the predetermined point P. This makes it possible to avoid a sudden pull with a significant force on the optical fiber unit 7 at the moment when the optical fiber element reaches the capstan 25 and comes into contact with the inner walls of the tube 3 due to the turn around the capstan wheel. In FIG. 2 two different solutions for this monitoring have been illustrated, though in practical implementations it may be sufficient to have only one of the alternatives in use. In both alternatives illustrated by way of example, a distance X from the outlet 4 of the extruder head to the predetermined point P at the capstan 25 is known. Therefore, the apparatus is aware of how much of the optical fiber unit 7 the feeding device 13 should still feed during launch before it needs to be deactivated.

It needs to be observed, that in FIG. 2 it is for simplicity assumed that the feed and acceleration provided by the feeding device 13 during launch should end when the leading end of the optical fiber unit 7 is located at a position below the capstan, in other words after distance X. However, in praxis this is a minimum distance, and in many practical implementations it is preferable that the acceleration during launch continues still further, such that the predetermined point P and the leading end of the optical fiber unit 7 is located higher up in FIG. 2, or somewhere else along the periphery 19 of the capstan when the launch and acceleration ends. Naturally the distance X will then be longer than illustrated in FIG. 2.

In any case as distance X is known, a first alternative is to provide the feeding device 13, for instance, with a sensor 26 providing to the control unit 23 a signal indicating the distance the optical fiber unit 7 has moved since launch. In this way, when the distance to the capstan 25 is known, it becomes possible to calculate in the control unit 23 the moment when the measured distance reaches the predetermined value X and ensure that the acceleration of the optical fiber unit 7 to the tube speed has been completed at this moment.

A second alternative is to provide the control unit 23, for instance, with a timer 27 measuring the time passed since the launch. In this way, as the tube speed and distance X is known, the time available and remaining for acceleration can be calculated. Consequently, the control unit 23 can with the timer ensure that the tube speed is reached at the correct moment.

A challenge with rapidly accelerating the optical fiber unit 7 with the feeding device 13 is to ensure that the optical fiber unit 7 does not slip out of the space between the pair of wheels of the feeding device 13. Practical tests have indicated that careful selection of the surface material is important in this regard. A combination of a first wheel having a thermoplastic surface, such as polyurethane, with a second wheel with a metal surface, such as aluminum, has provided excellent results. In that case both wheels may have a flat peripheral surface. Alternatively, one or both of the wheels may include a groove dimensioned to receive the optical fiber unit. Either or both wheels may be driven by an electric motor during acceleration.

A solution involving a flat wheel with a polyurethan surface which is driven by an electric motor in combination with a flat wheel with an aluminum surface which is implemented as a free-rolling wheel is advantageous. In that case, and also with other surface materials, additional guide elements may be provided before and after the pair of wheels to ensure that the optical fiber unit 7 does not slip out of the space between the pair of wheels of the feeding device 13. Such guide elements may be implemented by additional rollers, or alternative as stationary elements, such as a loop element or a groove, for instance, supporting the optical fiber unit from the opposite sides.

Figure 3:
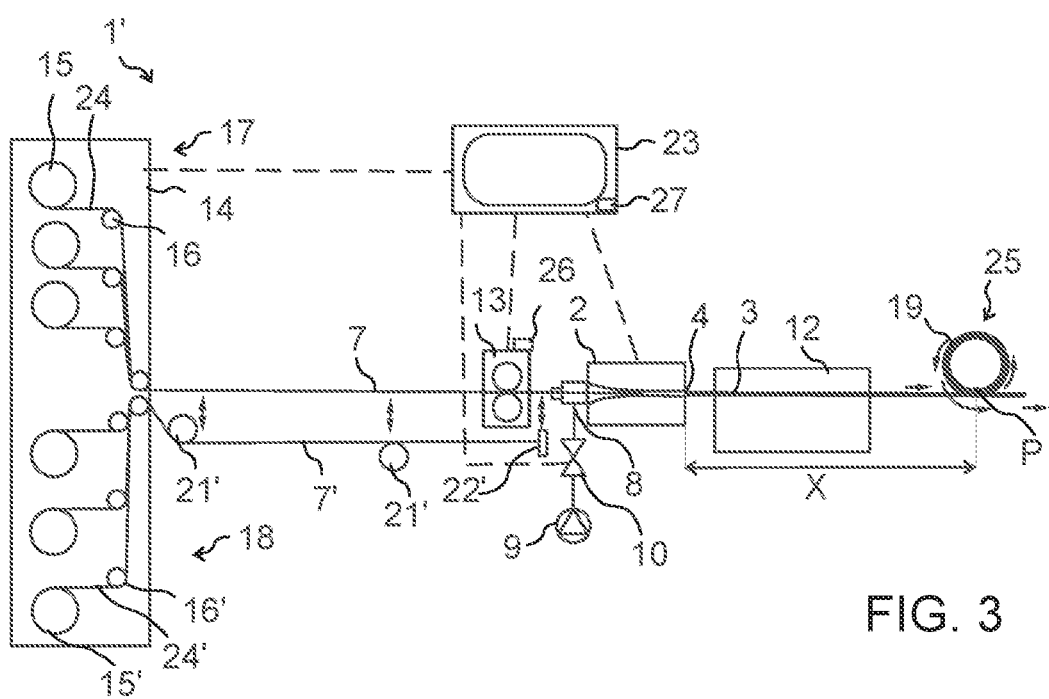
FIG. 3 illustrates a second embodiment of an apparatus.

FIG. 3 illustrates a second embodiment of an apparatus 1'. The apparatus of FIG. 3 is very similar to the one explained in connection with FIG. 2. Therefore, in the following the embodiment of FIG. 3 will be mainly explained by pointing out the differences between these embodiments.

In FIG. 3 the apparatus 1' is provided with an additional set of reels 21' and a gripping device 22' in order to thread and prepare fibers and yarns, for instance, in an off-line position for a second optical fiber unit 7' while the optical fiber unit 7 is used for production.

Consequently, instead of having to wait before the reel 15 or any of the other reels in the upper set 17 runs out of material (such optical fiber or yarn) and the production due to this needs to be interrupted before the material on the reels 15' of the lower set 18 of reels can be threaded, this can be done in advance in the off-line position.

This becomes possible by means of the additional reels 21' via which the at least one optical fiber of a second optical fiber unit 7' can be threaded all the way to the gripping device 22'. After this, the gripping device 22' keeps the leading end of the second optical fiber unit 7' steady, until a switchover from the optical fiber unit 7 needs to be done. At this stage, the apparatus 1' is configured to move the second fiber unit 7' with the gripping device 22' and the reels 21' to an input of the feeding device 13. Shortly after this a new fiber launch can be triggered, due to which the time needed for the production stop can be minimized.

In FIG. 3 the gripping device 22' and the additional reels 21' are only schematically illustrated. In praxis, they are preferably continuously located on the same horizontal plane as the inlet to the extruder head 2 and the feeding device 13, such that they can be moved sideways on this horizontal plane into position once needed. However, other practical implementations may also exist.

It is to be understood that the above description and the accompanying figures are only intended to illustrate the present invention. It will be obvious to a person skilled in the art that the invention can be varied and modified without departing from the scope of the invention.

The invention claimed is:
1. An apparatus for processing an optical fiber unit, the apparatus comprising
an extruder head with an inlet configured to receive an optical fiber unit including at least one optical fiber and an outlet configured to output, with a tube speed, a produced tube,
a connection to a fluid source configured to feed fluid from the fluid source into the produced tube, a capstan configured to receive and pass on the produced tube, such that the produced tube contacts an outer periphery of the capstan by extending around the capstan, and a feeding device, and a control unit configured to control the operation of one or more of the extruder head, the feeding device, and the connection to the fluid source during launch to launch the optical fiber unit to move with the tube by activating the feeding device to accelerate the optical fiber unit via the inlet into the tube such that the optical fiber unit reaches the tube speed when the optical fiber unit has reached a predetermined point on the capstan, at which stage the feeding device is deactivated.

2. The apparatus according to claim 1, wherein the optical fiber unit reaches the predetermined point on the capstan when the optical fiber unit surrounds 0-360° of the outer periphery of the capstan.

3. The apparatus according to claim 1, wherein the optical fiber unit reaches the predetermined point on the capstan when the optical fiber unit has completed at least one lap around the capstan.

4. The apparatus according to claim 1, wherein the apparatus is configured to reduce feeding of the fluid from the fluid source into the produced tube after the fiber launch.

5. The apparatus according to claim 1, wherein the apparatus is configured to stop feeding of the fluid from the fluid source into the produced tube after the fiber launch.

6. The apparatus according to claim 1, wherein the apparatus comprises a cooling trough configured to receive the tube containing the optical fiber unit from the outlet of the extruder head and the capstan is configured to receive the tube containing the optical fiber unit from the cooling trough.

7. The apparatus according to claim 1, wherein the fluid provided by the fluid source is air.

8. The apparatus according to claim 1, wherein the feeding device comprises a pair of wheels contacting the optical fiber unit, a first one of the wheels has a thermoplastic surface and a second one of the wheels has a metal surface, and at least one of the pair of wheels is a driving wheel.

9. The apparatus according to claim 8, wherein the first wheel has a surface of polyurethane, and the second wheel has a surface of aluminum.

10. The apparatus according to claim 1, wherein the apparatus comprises:

a reel for the at least one optical fiber of the optical fiber unit, a reel for at least one second optical fiber of a second optical fiber unit, and a gripping device configured to grip and keep steady the second fiber unit while the optical fiber unit is outputted with the produced tube, wherein the apparatus is configured to move the second fiber unit with the gripping device to the feeding device for launching to move with the tube when the reel for the at least one optical fiber is empty.

11. The apparatus according to claim 1, wherein the apparatus comprises a sensor configured to provide the control unit with a signal indicating the distance the optical fiber unit has moved since the launch, and the control unit is configured to control a speed of the feeding device based on the signal.

12. The apparatus according to claim 11, wherein the speed of the feeding device is controlled to reach the tube speed when the optical fiber unit has reached the predetermined point on the capstan.

13. The apparatus according to claim 1, wherein apparatus comprises a timer configured to provide the control unit with a signal indicating the time passed since the launch, and the control unit is configured to control a speed of the feeding device based on the signal.

14. The apparatus according to claim 1, wherein the control unit is configured to control the apparatus to prevent the optical fiber unit from contacting inner walls of the produced tube in a predefined amount, prior to a predefined timing, and wherein the fluid source is controlled to provide the fluid no later than when the feeding device is activated.

15. The apparatus according to claim 14, wherein the optical fiber unit is slidable in relation to the predefined tube.

16. The apparatus according to claim 14, wherein the feeding device is activated after the fluid source is controlled to provide the fluid.

17. A method for processing an optical fiber unit, the method comprising:

producing and outputting, with a tube speed, a produced tube via an outlet of an extruder head to a capstan, the capstan receiving the produced tube, which contacts an outer periphery of the capstan by extending around the capstan, and passing on the produced tube, initiating feeding of fluid into the produced tube, and feeding and accelerating the optical fiber unit via an inlet of the extruder head into the tube such that the optical fiber unit reaches the tube speed when the optical fiber unit has reached a predetermined point on the capstan at which stage the feeding is deactivated.

18. The method according to claim 17, wherein the fluid fed into the produced tube is air.

19. The method according to claim 17, wherein the optical fiber unit does not contact inner walls of the produced tube in a predefined amount, prior to a predefined timing, and wherein the fluid is provided no later than when the feeding device is activated.

20. The method according to claim 19, wherein the optical fiber unit is slidable in relation to the predefined tube.

* * * * *